Nov. 6, 1945.    R. A. JOHNSON    2,388,265
MACHINE TOOL
Filed Oct. 8, 1943    2 Sheets-Sheet 2
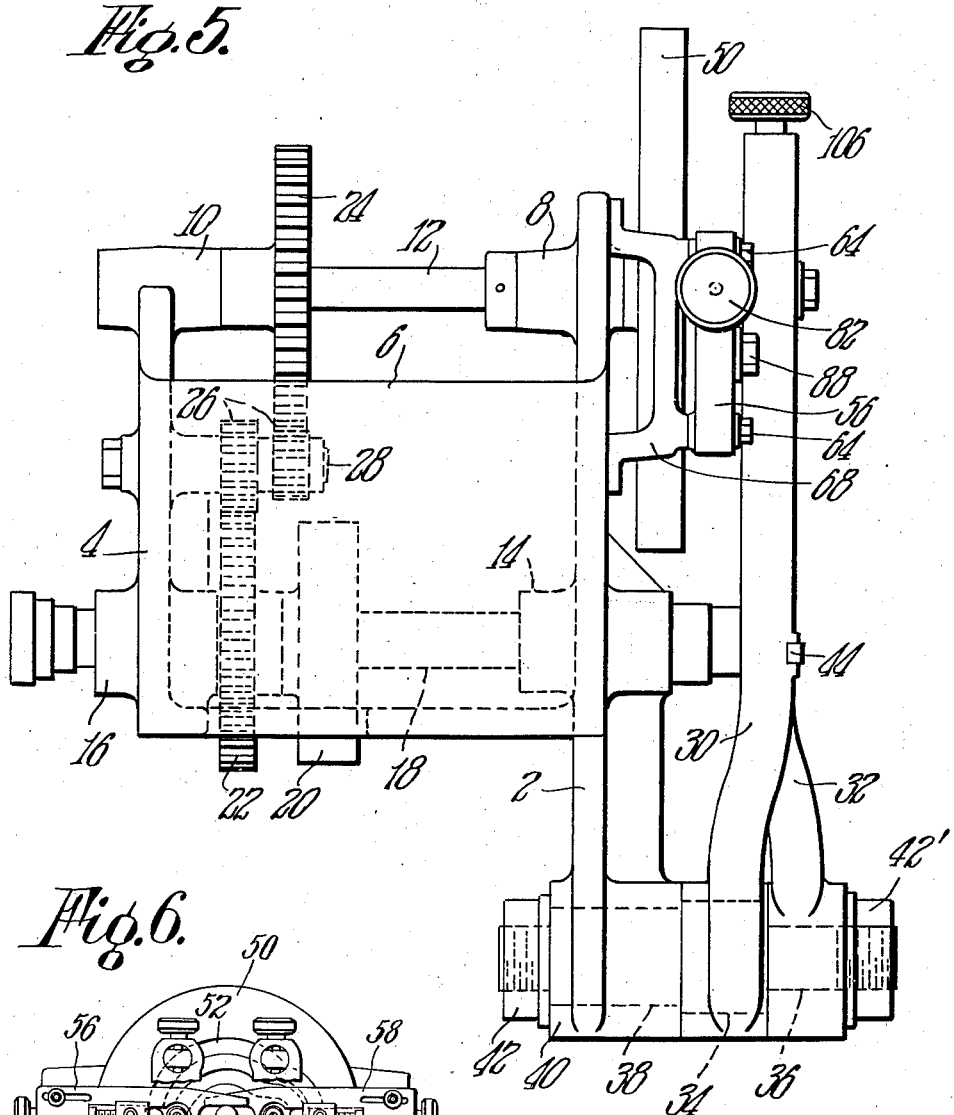
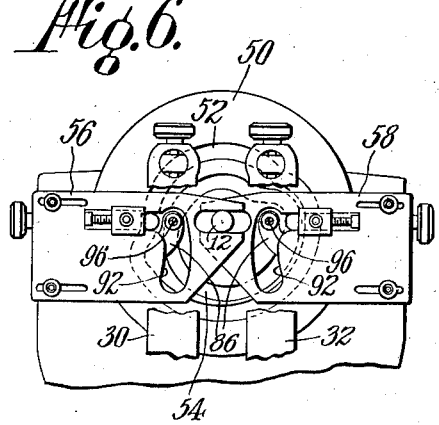
INVENTOR.
Robert A. Johnson.
BY
Walter C. Ross.
Attorney.

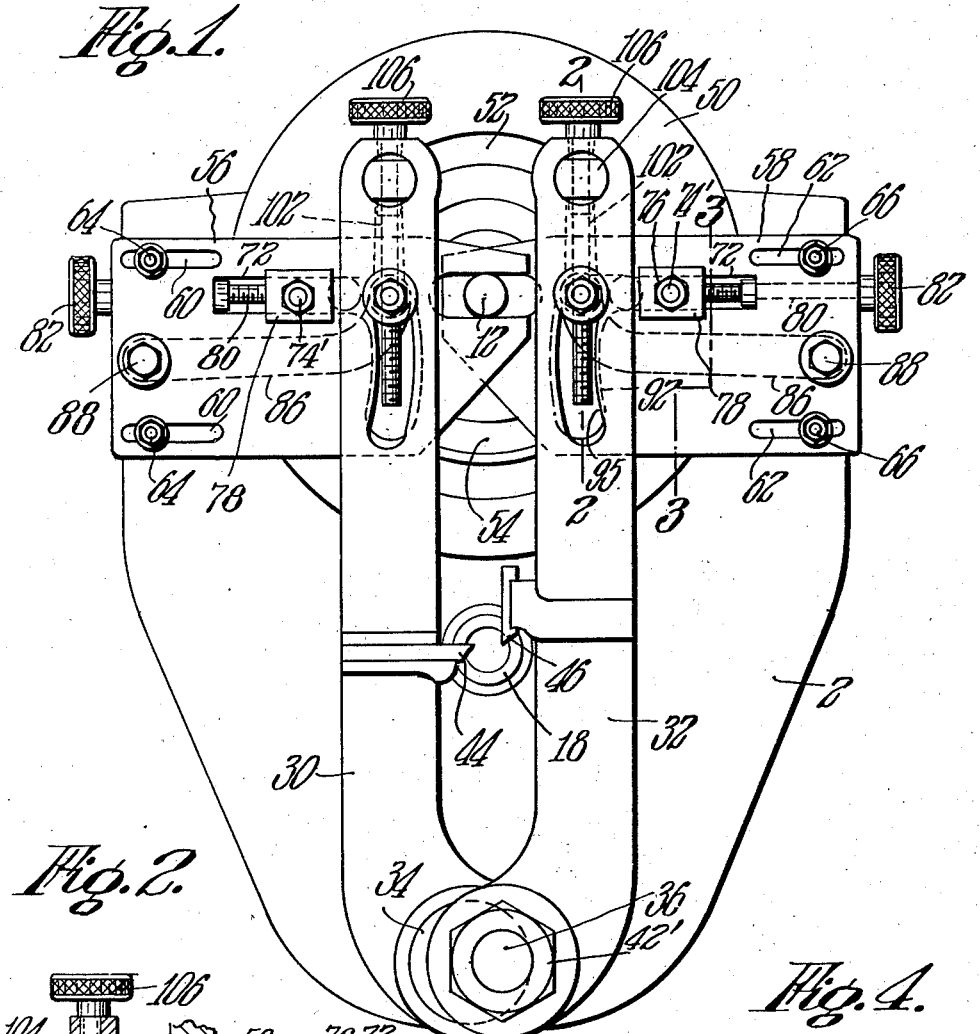

Patented Nov. 6, 1945

2,388,265

UNITED STATES PATENT OFFICE 2,388,265

MACHINE TOOL

Robert A. Johnson, Longmeadow, Mass.

Application October 8, 1943, Serial No. 505,492

5 Claims. (Cl. 82—25)

This invention relates to improvements in machine tools and is directed more particularly to automatic machines for successively forming objects on the end of bar stock.

The principal objects of the invention are directed to apparatus for forming successive objects on the end of a bar of stock which apparatus is simple in construction and is adapted for high speed and accuracy in operation.

According to one feature of the invention the machine includes independently operable tool carrying members that are operated from a single operating source, such as cam means, with connections between said source and members adapted for independent adjustment, thereby making it possible to vary the extent of movement of the carriers independently of one another and at the same time varying the relation of the tools and work. This makes it possible to perform various operations and varying the relation thereof from a single operating source without the necessity of changing the operating course as is necessary with prior art machines.

As another feature of the invention, the tool carrier members are directly connected to the actuating means therefor, thereby eliminating the various connections common with prior art machines which contribute to lost motion, looseness and resulting inaccuracy of work.

As a further feature of the invention, the tool carriers are mounted for movement back and forth at a point remote from their connection with the actuating means with the tools carried therebetween so that rigidity is provided to insure accuracy, avoidance of tool chatter and the conditions which produce inaccuracy and other objections.

Various novel features and advantages will be observed from the following description of the invention in the form at present preferred. It will be understood that various changes and modifications may be made in the form of the invention without departing from the spirit and scope thereof.

In the drawings:

Fig. 1 is a front elevational view of a machine embodying the novel features of the invention;

Figs. 2 and 3 are sectional elevational views on the lines 2—2 and 3—3 of Fig. 1;

Fig. 4 is a plan view of one of the cam roll blocks connecting a slide with the cam;

Fig. 5 is a side elevational view of the machine shown in Fig. 1; and

Fig. 6 is a partial front elevational view similar to Fig. 1 with parts broken away.

Referring to the drawings more in detail, the invention will now be fully described.

A frame includes front and rear members 2 and 4 that may be connected together by side parts 6 with bearings 8 and 10 provided for a shaft 12 while other bearings 14 and 16 are provided for a spindle 18.

The frame may take any form desired to rotatably support the shaft 12 which may be called a cam shaft and the work spindle 18. Either the shaft or spindle may be driven but in the form shown the spindle 18 is provided with a pulley 20 for connection to a suitable source of power such as a motor. The shaft 12 and spindle 18 will be suitably connected so that one will rotate at the desired speed relative to the other and for that purpose gears 22 and 24 carried by the spindle 18 and shaft 12 are in meshing engagement with integral gears 26 on a stud 28. Other operative connections as desired may be provided.

The spindle 18 is hollow and is adapted to carry a bar of stock for rotating the same. The bar of stock has its forward end presented to the tools of the machine and as an object is formed and cut from the bar, the said bar is moved forwardly to present a new portion thereof. The construction may be that well known in the art and forms no part of the present invention except that it is desired to provide a rotating spindle for a bar of stock.

Tool carriers 30 and 32 have lower ends swingably mounted on portions 34 and 36 of a pivot member 38. The pivot member is carried by a boss 40 of the frame member 2 and is clamped therein by a nut 42 in threaded engagement therewith, as shown. The parts 34 and 36 of the pivot are relatively offset so that the pivot may be turned to various positions in its support to vary the relation of the axes of oscillation of the carriers 30 and 32. A nut 42' in threaded engagement with 36 holds the member 32 thereon.

The carrier 30 may carry a forming-tool 44 and the carrier 32 may carry a cutting-off tool 46. The former will be adapted to form an object on the end of a bar of stock while the latter will cut the formed object from the bar. The tools may vary in form and be associated with the carrier in various ways.

A cam 50 fixed to shaft 12 has grooves 52 and 54 therein, one for each of the tool carriers.

The grooves 52 and 54 of the cam may take various forms. It is intended that they be such that through the connections with the carriers they will move the carriers back and forth. As will be observed it will be possible to utilize all or part of the carrier movement in contacting the tools with the work and to vary the arc of movement of the carriers.

Slides 56 and 58 are provided which have inner forked ends slidably receiving the shaft 12, as shown, and their outer ends are provided with slots 60 and 62 that receive bolts 64 and 66 carried by the frame member 2, or by brackets such as 68, carried thereby at opposite sides.

By means of the construction described, the slides are guided for independent straight-line movements back and forth so that by the connections to be described, the carriers may be independently moved back and forth to actuate the tool carriers 30 and 32.

The connections between the slides and their respective carriers are similar so that the connection between slide 58 and carrier 32 only need be described in detail.

A block 70 is reciprocable in a slot 72 provided in slide 58 and it has flange portions 72' for abutting the rear inner side of the slide 58. A cam roll 74 carried by the block is disposed in one of the grooves of the cam, such as the groove 52. A threaded stud 74' of the block 70 receives a nut 76, and a plate 78 on the said stud engages the outer face of the slide. The nut 76 may be tightened to hold the block in various positions of adjustment in the slot 72 of the slide.

An adjusting screw 80 rotatable in the slide 58 has a threaded end in engagement with the block 70 and a manually engageable part 82 is carried thereby. With the nut 76 loosened the block may be moved back and forth in the slide by rotating the screw 80.

A lever 86 is pivoted at 88 to the slide and its free end has a hub part 90 for bearing against the rear face of carrier 32. An opening 92 is provided in the slide to permit swinging of the lever 86.

A cylindrical member 94 disposed in slot 95 of lever 32 has a threaded stud 96 on which are a washer 98 and a nut 100. A round part 94' thereof extends rearwardly and has a bearing fit in the hub part 90 of the free end of lever 86.

A screw 102 is rotatable in a member 104 oscillatable in lever 32 and its lower end is in threaded engagement with member 94. A manually engageable member 106 on screw 102 is provided for rotating the screw 102 so that the member 94 may be moved up and down in slot 95. The nut and washer 100 and 98 cooperate with screw 102 to hold the member 94 in adjusted positions in the slot 95.

The ability to move the blocks 70 of the carriers back and forth relative to the slide facilitates positioning the carriers and the tools as may be desired relative to the work while the ability to adjust the connection between the slides and carriers makes it possible to vary the angle of movement of the carriers and tools.

Hence, it will be observed that the independent adjustments make it possible to vary the relative timing and operation of the tools from the cam means which need not be varied all to the end that various operations may be performed and changed at will by merely adjusting the connections between the cam and slides and between the latter and the tool carriers.

The pivotal connection between the frame and carriers being adjustable as described facilitates varying the axes of oscillation of the carriers and thereby the relation of the tools carried thereby. The tools are disposed intermediate the connections of the carriers and frame and the connections of the carriers and actuating means which makes for rigidity and smoothness of operation to contribute to accuracy and speed in operation.

The invention may be embodied in other specific forms without departing from the essential characteristics thereof. Hence, the present embodiments are therefore to be considered in all respects merely as being illustrative and not as being restrictive, the scope of the invention being indicated by the appended claims rather than by the foregoing description, and all modifications and variations as fall within the meaning and purview and range of equivalency of the appended claims are therefore intended to be embraced therein.

What it is desired to claim and secure by Letters Patent of the United States is:

1. A machine tool of the class described comprising in combination, a support, a cam shaft rotatable in the upper portion of said support, separate tool carriers having lower ends mounted for swinging movements in the lower portion of said support and having upwardly extending free ends disposed at opposite sides of said cam shaft, a spindle rotatable in the support between and intermediate the opposite ends of the carriers and tools carried by said carriers adjacent said spindle, a cam on said cam shaft having a forward face provided with a cam groove for each carrier, separate slides one for each carrier mounted on said support adjacent the forward face of the cam and the free ends of the carriers for straight-line independent reciprocating movements, operative adjustable connections between said slides and said cam grooves whereby the slides are reciprocated by rotation of the cam, and adjustable connections between said slides and carriers whereby the latter are swung back and forth by the former, said first-named connections including blocks slidable in said slides having members disposed in said grooves and means for moving said blocks in the slides.

2. A machine tool of the class described comprising in combination, a support, a cam shaft and spindle rotatable in said support, pivot means for tool carriers mounted on said support, said cam shaft and pivot means being spaced apart with said spindle intermediate the same, separate tool carriers having lower ends mounted on said pivot means for swinging movements and extending vertically upwardly therefrom at opposite sides of the longitudinal axis of said spindle with free ends at opposite sides of the longitudinal axis of said cam shaft, tools carried by said carriers intermediate their ends and adjacent said spindle, a face cam on said cam shaft having a forward face in a single plane provided with grooves one for each of said carriers, slides at opposite sides of the longitudinal axis of the cam shaft mounted on the support for independent horizontal straight-line reciprocating movements back and forth, connections between said cam grooves and slides whereby the said slides are reciprocated as the cam is rotated, and connections between the slides and carriers whereby the latter are swung as the slides are reciprocated.

3. A machine tool of the class described comprising in combination, a support, a cam shaft and spindle rotatable in said support, pivot means for tool carriers mounted on said support, said cam shaft and pivot means being spaced apart with said spindle intermediate the same, separate tool carriers having lower ends mounted on said pivot means for swinging movements and extending vertically upwardly at opposite sides of the longitudinal axis of said spindle with upper free ends at opposite sides of the longitudinal axis of said cam shaft, tools carried by said carriers adjacent said spindle, a cam on said cam shaft having a forward face provided with grooves one for each of said carriers, slides at opposite sides of the longitudinal axis of the cam shaft mounted on the support for straight-line independent horizontal reciprocating movements back and forth, connections between said cam grooves and slides whereby the said slides are reciprocated as the cam is rotated, and connections between the slides and carriers whereby the latter are swung as the slides are reciprocated, said first-named connections including blocks slidable in slots provided in said slides and having members disposed in said cam grooves, and means holding said blocks in adjusted positions in said slots of the slides.

4. A machine tool of the class described comprising in combination, a support, a cam shaft and spindle rotatable in said support, pivot means for tool carriers mounted on said support, said cam shaft and pivot means being spaced apart with said spindle intermediate the same, separate tool carriers having lower ends mounted on said pivot means for swinging movements and extending vertically upwardly at opposite sides of the longitudinal axis of said spindle with free ends at opposite sides of the longitudinal axis of said cam shaft, tools carried by said carriers adjacent said spindle, a cam on said cam shaft having a forward face provided with grooves one for each carrier, slides at opposite sides of the longitudinal axis of the cam shaft mounted on the support for independent horizontal reciprocating movements back and forth, connections between said cam grooves and slides whereby the said slides are reciprocated as the cam is rotated, and connections between the slides and carriers whereby the latter are swung as the slides are reciprocated, said last named connections including levers pivoted on said slides having free ends movable back and forth in slots provided in said carriers and means holding the free ends of said levers in adjusted positions in the slots of the carriers.

5. A machine tool of the class described comprising in combination, a support, a cam shaft and spindle rotatable in said support, pivot means for tool carriers mounted on said support, said cam shaft and pivot means being spaced apart with said spindle intermediate the same, separate tool carriers having lower ends mounted on said pivot means for swinging movements and extending vertically upwardly at opposite sides of the longitudinal axis of said spindle with free ends at opposite sides of the longitudinal axis of said cam shaft, tools carried by said carriers adjacent said spindle, a cam on said cam shaft having a forward face provided with grooves one for each carrier, slides at opposite sides of the longitudinal axis of the cam shaft mounted on the support for straight-line independent horizontal reciprocating movements back and forth, connections between said cam grooves and slides whereby the said slides are reciprocated as the cam is rotated, and connections between the slides and carriers whereby the latter are swung as the slides are reciprocated, said first-named connections including blocks slidable in slots provided in said slides and having members disposed in said cam grooves and means holding said blocks in adjusted positions in said slots of the slides, said last named connection including levers pivoted on said slides having free ends movable back and forth in slots provided in said carriers and means holding the free ends of said levers in adjusted positions in the slots of the carriers.

ROBERT A. JOHNSON.